United States Patent [19]
Busenberg

[11] Patent Number: 5,251,037
[45] Date of Patent: Oct. 5, 1993

[54] METHOD AND APPARATUS FOR GENERATING HIGH RESOLUTION CCD CAMERA IMAGES

[75] Inventor: Stavros N. Busenberg, Claremont, Calif.

[73] Assignee: Hughes Training, Inc., Arlington, Tex.

[21] Appl. No.: 838,611

[22] Filed: Feb. 18, 1992

[51] Int. Cl.$^5$ .................. H04N 3/14; H04N 5/335
[52] U.S. Cl. ...................... 358/213.28; 354/65
[58] Field of Search ............ 358/213.28; 382/1; 354/65

[56] References Cited

U.S. PATENT DOCUMENTS

| | | | |
|---|---|---|---|
| 4,765,564 | 8/1988 | Colvocoresses | 358/213.19 |
| 4,878,247 | 10/1989 | Wester-Ebbinghaus et al. | 382/1 |
| 4,897,678 | 1/1990 | Leberl et al. | 354/81 |
| 4,910,401 | 3/1990 | Woods | 250/332 |
| 5,023,921 | 6/1991 | Goatte et al. | 382/58 |

Primary Examiner—Joseph Mancuso
Assistant Examiner—Joseph Colaianni
Attorney, Agent, or Firm—Wanda K. Denson-Low

[57] ABSTRACT

A method and system for generating high resolution photogrammetric images from a CCD camera. The method of the invention includes the steps of a) acquiring sequential images of terrain from a moving vehicle with a partially masked CCD camera having n uniformly staggered registers exposed at any given time; b) establishing the position of said vehicle; and c) processing the output of said camera to obtain a database of improved resolution data. Thus, an illustrative and more efficient system and method are provided for generating high resolution photogrammetric image data from a CCD camera.

7 Claims, 6 Drawing Sheets

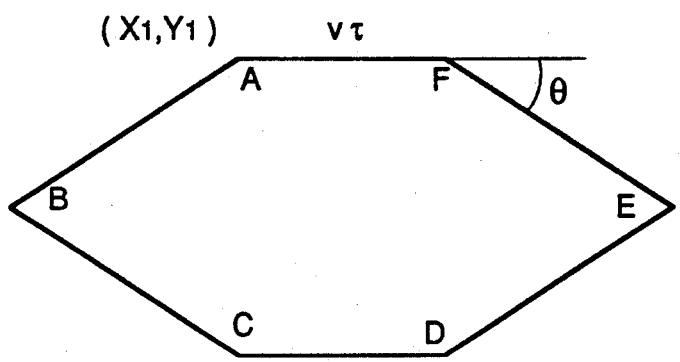
FIG. 3.
FIG. 4.
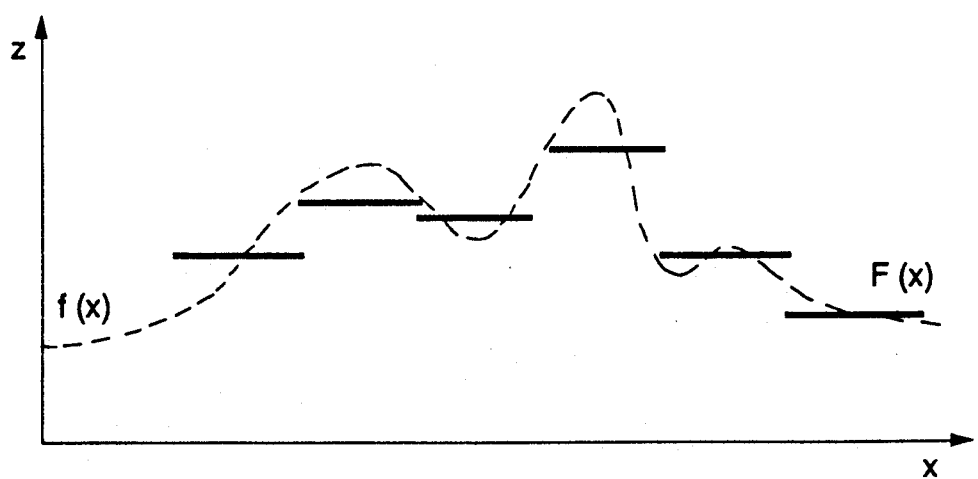

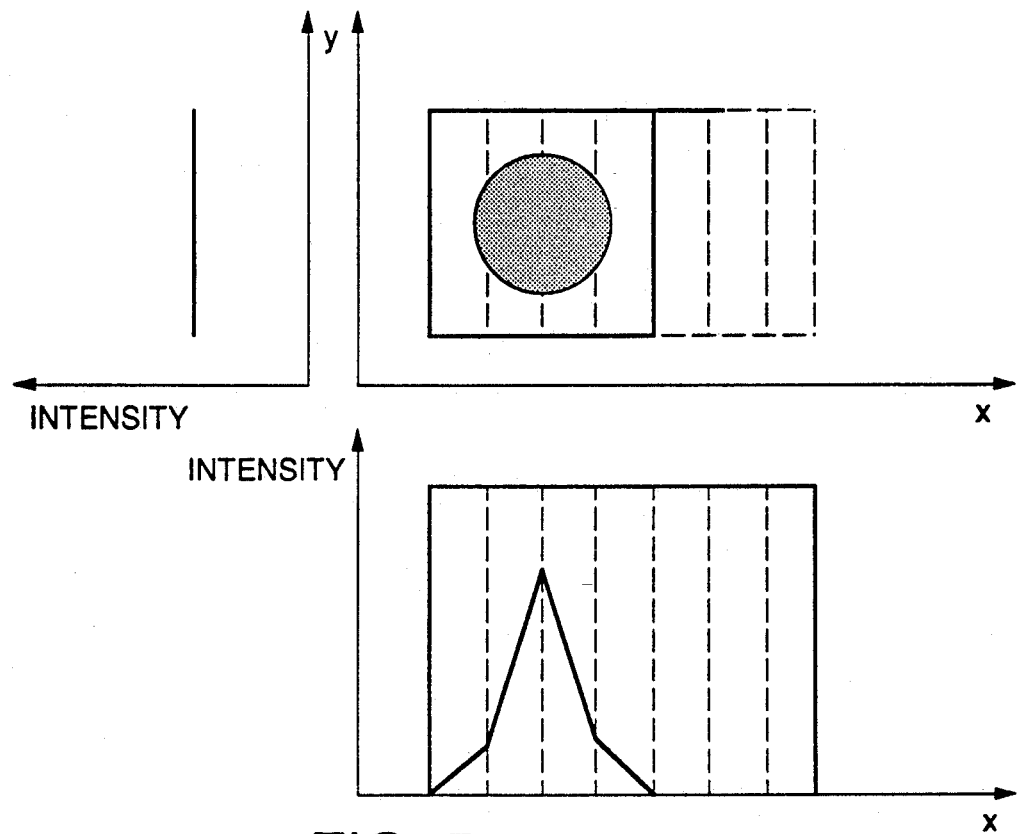
FIG. 5.
FIG. 6.
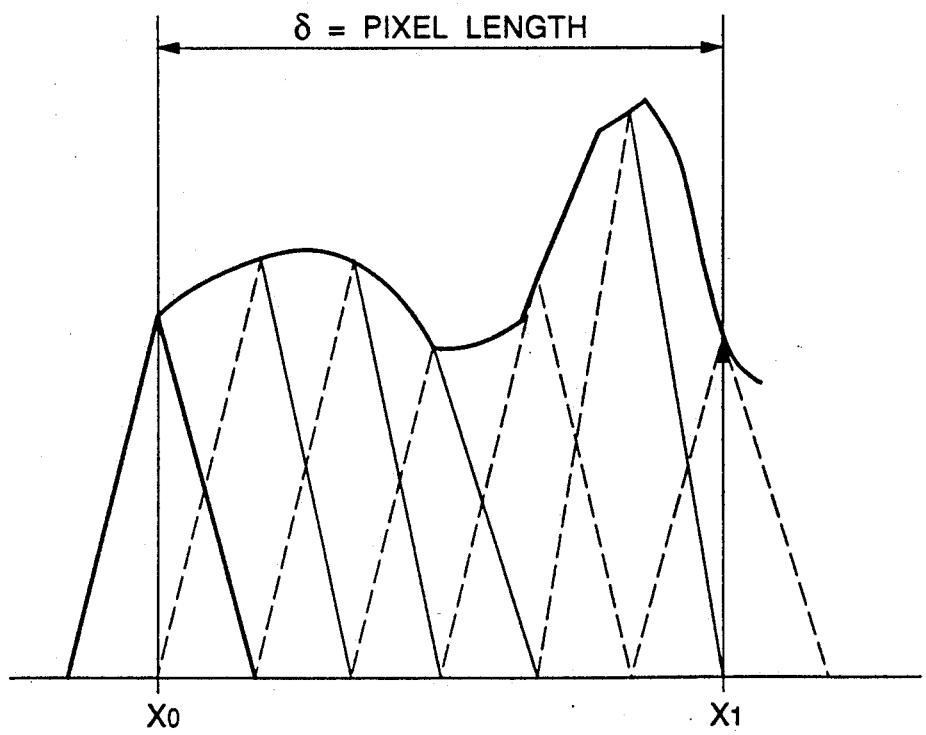

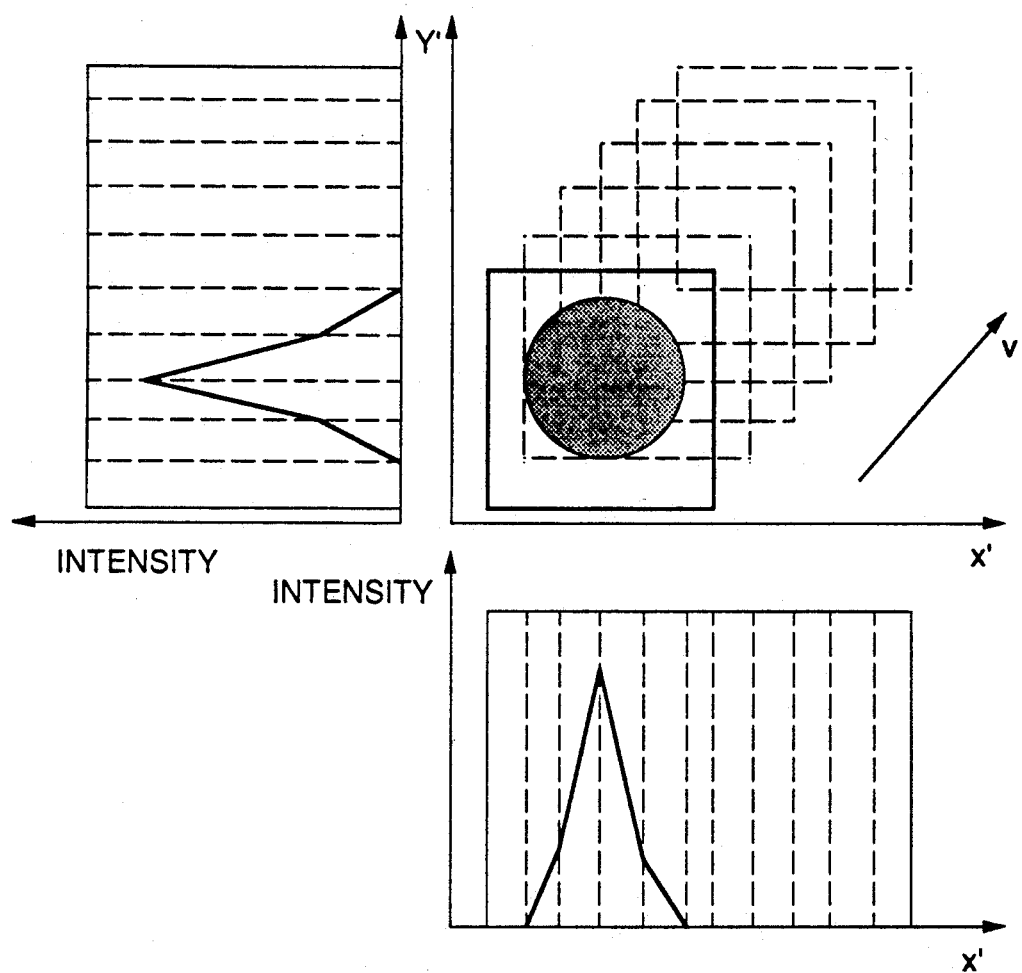
FIG. 7.
FIG. 8.
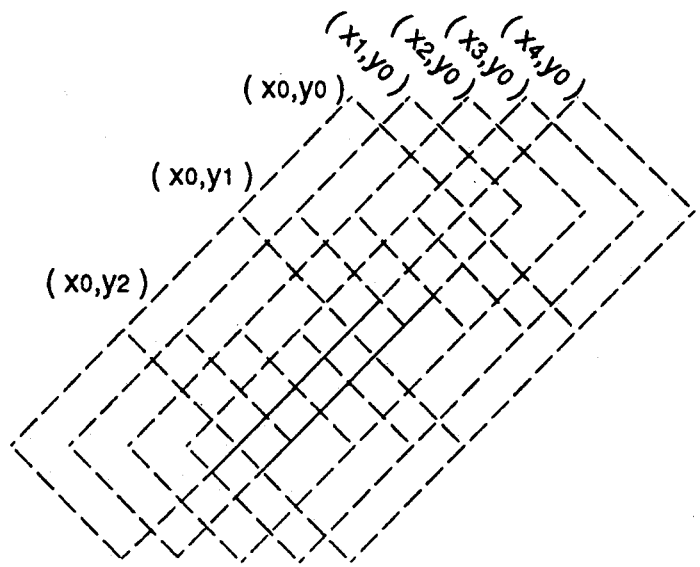

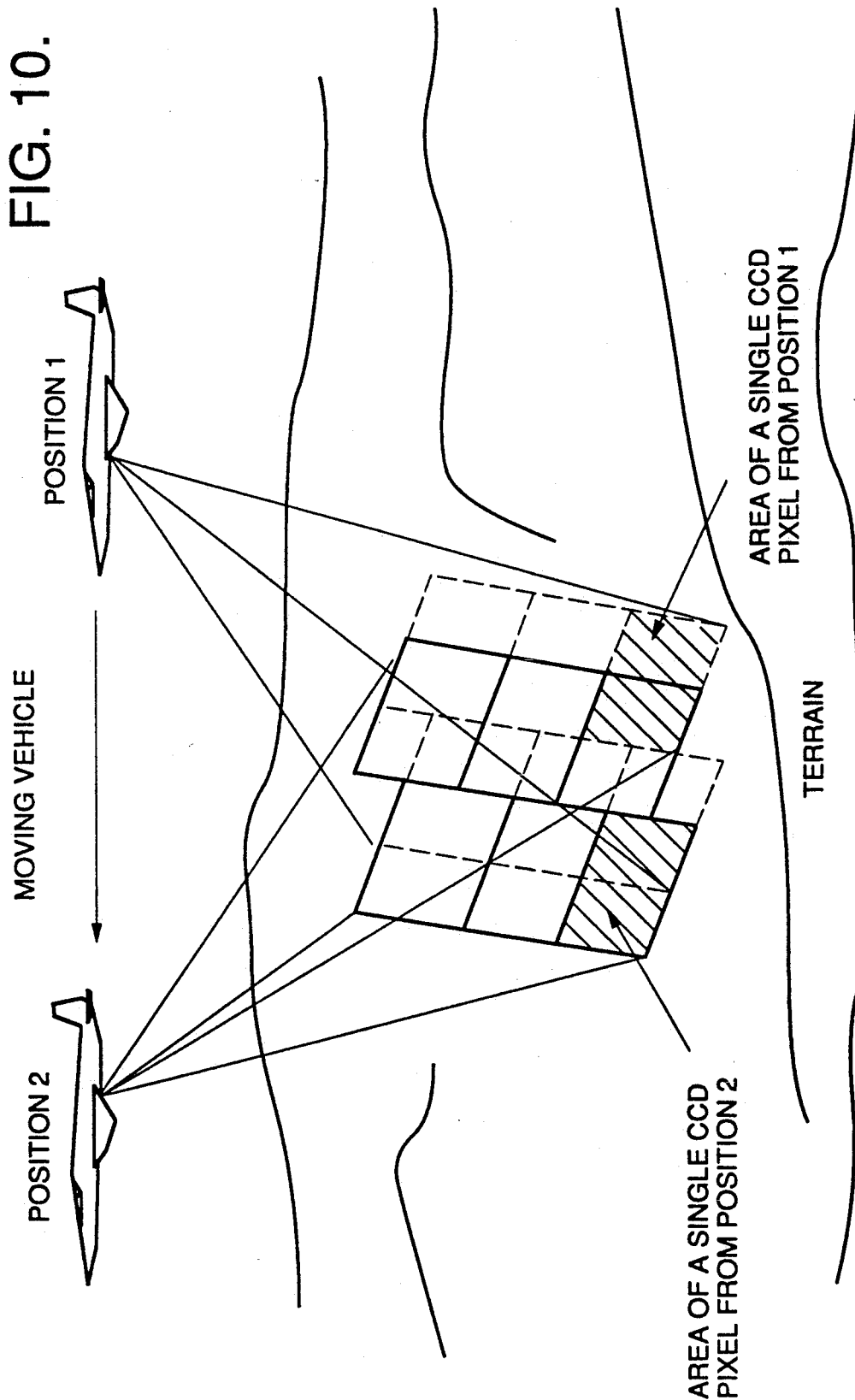

FIG. 9.
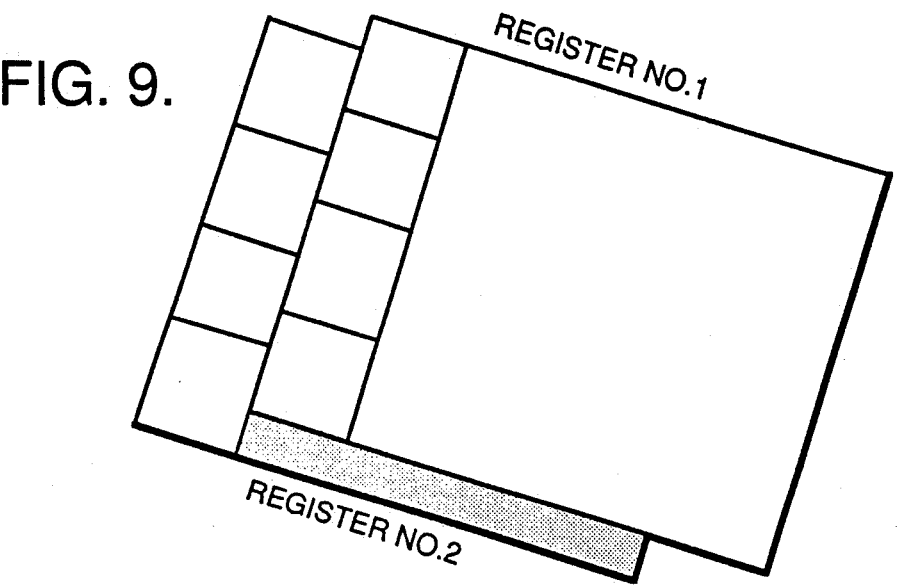
FIG. 11.
FIG. 12.
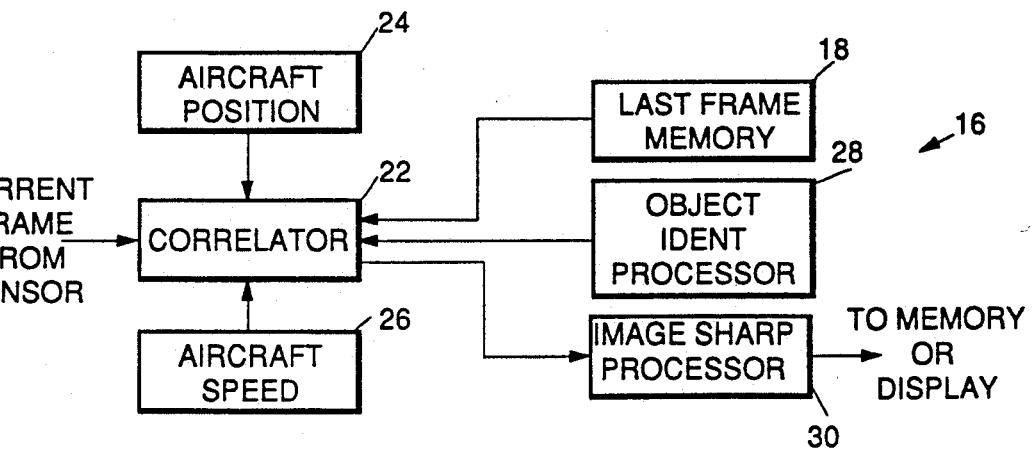

METHOD AND APPARATUS FOR GENERATING HIGH RESOLUTION CCD CAMERA IMAGES

BACKGROUND OF THE INVENTION

1. Field of the Invention

The present invention relates to photogrammetry. More specifically, the present invention relates to methods and apparatus for improving the resolution of charge coupled device (CCD) cameras used in photogrammetric applications.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Photogrammetry involves the use of aerial photography to produce maps and charts. Generally, photogrammetry works on the principle of stereo pairs in that an area is photographed from two different camera positions. The area of common coverage in each photograph is called the stereoscopic overlap. This area offers the means to determine the depth of a particular scene.

Each photograph may be considered a record of the various light rays or intensities which travel from the object viewed and are typically registered on photographic film. The intersection of corresponding light rays from each photograph provides information on the 3-dimensional aspects of the terrain.

Thus, traditional data acquisition in the generation of 3-D databases is in the form of photography. However, there are certain limitations associated with the use of conventional photographic techniques in photogrammetric applications. For example, the production of digitized visual databases from photographs is somewhat costly and time consuming. In addition, the quality of the visual data is limited by the grain size of the photographic film. Also, such data is often not up to date, requires time consuming film processing and needs to be extensively processed in order to be put in digitized form.

Video data is often more current and in the case of CCD cameras is in digitized form. Hence, for photogrammetric applications a CCD camera would be quite useful. However, the resolution of standard CCD camera data is limited by the size of individual pixels of the CCD chip.

Thus, there is a need in the art for a more efficient technique for generating high resolution photogrammetric image data. Particularly, there is a need for a technique for improving the resolution of a CCD camera in a photogrammetric application.

SUMMARY OF THE INVENTION

The need in the art is addressed by the present invention which provides a method and system for generating high resolution photogrammetric images from a CCD camera. The method of the invention includes the steps of a) acquiring sequential images of terrain from a moving vehicle with a partially masked CCD camera having n uniformly staggered registers exposed at any given time; b) establishing the position of said vehicle; and c) processing the output of said camera to obtain a database of improved resolution data. Thus, an illustrative and more efficient system and method are provided for generating high resolution photogrammetric image data from a CCD camera.

BRIEF DESCRIPTION OF THE DRAWINGS

FIG. 3 depicts the boundary points of a CCD pixel.

FIG. 4 depicts full frame CCD resolution in which f(x) represents the actual intensities of an object on the ground and F(x) represents the discrete average intensities of the object as recorded by a full frame CCD.

FIG. 5 depicts pixel overlap in the x direction with no camera rotation (i.e. $\Theta=0$) and shows four overlapping pixels.

FIG. 6 depicts spline approximation in the x direction.

FIG. 7 depicts pixel overlap with a nonzero camera pointing angle $\Theta$.

FIG. 8 shows an overlap of a CCD camera in the x and y directions for 5 overlapping rows each containing 3 pixels.

FIG. 9 illustrates the pixel overlap of a multi-tiered parallel CCD register.

FIG. 10 illustrates the method of the present invention in the special case of doubling the resolution in each of two orthogonal directions, quadrupling the resolution of the CCD camera.

FIG. 11 shows an illustrative photogrammetric system for implementing the teachings of the present invention.

FIG. 12 is a block diagram of the processor of the illustrative photogrammetric system for implementing the teachings of the present invention.

DESCRIPTION OF THE INVENTION

Illustrative embodiments and exemplary applications will now be described with reference to the accompanying drawings to disclose the advantageous teachings of the present invention.

In copending application entitled METHOD AND APPARATUS FOR GENERATING HIGH RESOLUTION VIDICON CAMERA IMAGES, filed Feb. 18, 1992, Dr. Stavros N. Busenberg, Ser. No. 07/838,612, the teachings of which are incorporated herein by reference, a method and system are disclosed for improving the resolution of a Vidicon camera. Here, a method and system are disclosed for improving the resolution of a CCD camera.

Figure 1:
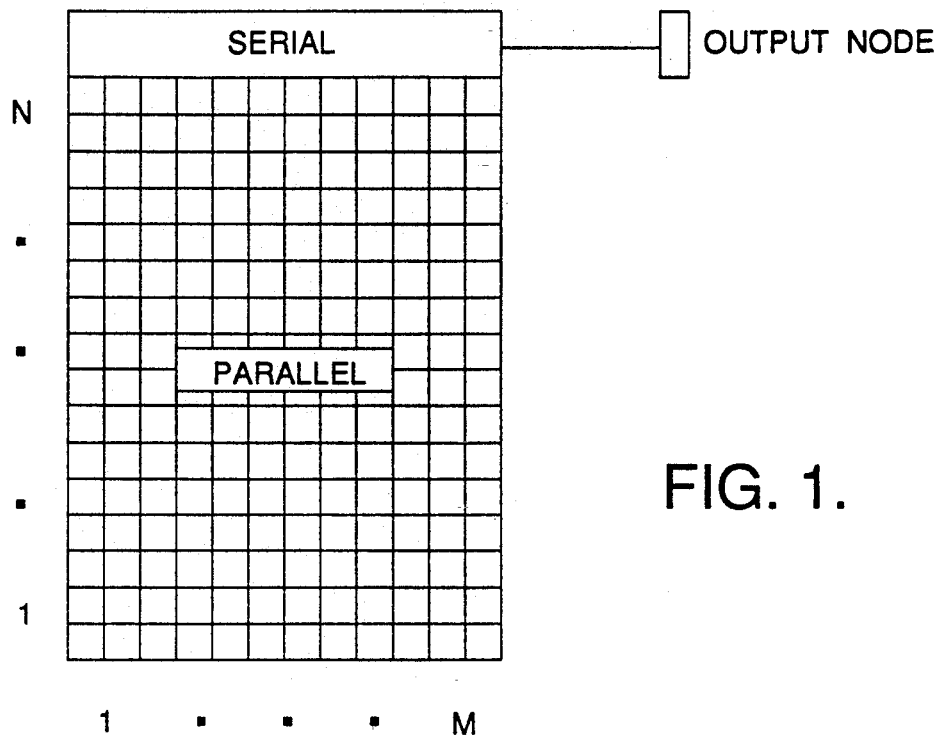
FIG. 1 illustrates the configuration of a typical conventional CCD array.

In a CCD camera, data is recorded on a charged coupled device, hence the designation "CCD". As is well known in the art, a CCD is a metal-oxide semiconductor that is comprised of up to several million independent detector sites, or pixels, where photo-induced charge is stored. The pixels are rectangular and range from 6 to 30 microns in size. When the CCD is struck by light, the resultant electronic charge is recorded in a two-dimensional area called a parallel register. The CCD also contains a second register, a serial register, which is a one-dimensional array with an element located at the top of each of the columns in the parallel register. This CCD format is shown in FIG. 1 which illustrates the format of a typical conventional CCD array. In an actual CCD camera, the number of pixels per row and column will be greater than that shown.

The charge accumulated in the parallel register is directly proportional to the exposure time, which can be controlled by an electronic shutter for exposures ranging from milliseconds to hours.

In order to generate an image, the CCD must perform the following four steps:

1) Photo-electric generation: Photons that make up the viewed image are absorbed within the silicon lattice of the CCD.

2) Electron collection: Intensities are recorded in the nearest collecting pixel.

3) Charge transfer: A programmed sequence of changing gate potentials between pixels causes the electrons to systematically shift one row towards the serial register. Subsequently, the top pixel row in the parallel register is shifted into the serial register.

4) Readout: Charged packets in the serial register are transported one-by-one over to the output amplifier. The output amplifier determines an amplified and digitized value proportional to the charge.

Three types of CCDs are used in digitized imaging. A full-frame CCD consists of a single parallel register used for electron generation, collection and transfer. With this architecture, however, incident exposure must be blocked during the read out process in order to prevent "smearing" the image.

A frame transfer CCD is composed of two CCDs connected in series, an image and storage register. During exposure the storage register is covered with an opaque mask so that the image register records the charge pattern. The entire image is then shifted to the storage register for the transfer and read out process. During the read out of the storage register, the image register may begin recording the next array of intensities. A frame transfer CCD can operate without the use of a shutter at television frame rates.

A partially masked CCD covers all but a small portion of the parallel register. A series of images is integrated on the register and then shifted under the masked portion of the register until the register is filled. Then the entire register is read out as a single image. Dividing the image into a series of subregisters reduces the number of pixels and increases the speed of image acquisition, thus yielding one possible advantage for serial data acquisition.

With the full frame CCD format, in order to prevent image smearing, exposure must be blocked using a shutter during the read out process. Yet, during the exposure time, regardless of the speed of this electronic shutter, tee image will be changing with respect to the velocity of an aircraft on which the camera is mounted while each pixel is being exposed. Therefore, using the CCD data format, relative to the aircraft frame of reference, the representation of the data with respect to the ground frame of reference may be defined.

Figure 2:
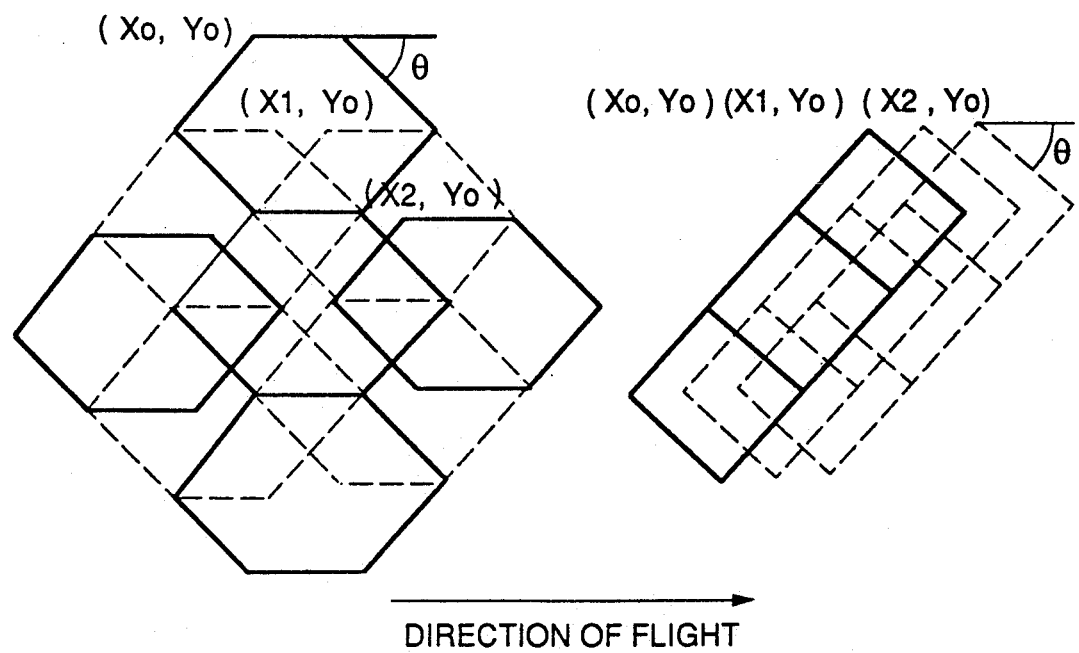
FIG. 2 depicts full framed and partially framed CCD formats in a fixed frame of reference.

FIG. 2 depicts full framed and partially framed CCD formats in a fixed frame of reference.

The basic characteristics of a CCD parallel register are defined below as well as the coordinates of one pixel projected on the ground for both a full framed and a partially masked CCD. Finally, relations are defined below between the geometries of each frame by a moving, partially masked CCD camera.

Mathematical Description of Parallel Register

FIG. 3 depicts the boundary points of a CCD pixel. With respect to FIGS. 1-3, the following notation for a frame in a moving frame of reference (the aircraft reference) is adopted. The positive x direction is the direction of flight, v denotes the velocity of the aircraft, H the height of the parallel register and W denotes the Width of the register. There are M pixels in each row and N pixels in each column. Let $\Theta$ be the angle between the top of the frame and the positive x axis. Let $\tau$ represent the exposure time on one pixel.

If the fixed frame of reference on the ground is examined, the image will be distorted due to the exposure time and the movement of the aircraft. For either the full framed or partially masked CCD, the corresponding pixels will be elongated simply depending on the angle $\Theta$ and the exposure time.

As mentioned above, the frames, in the fixed frame of reference, for both the full framed and partially masked CCDs are shown in FIG. 2. In this figure, $(x_i, y_i)$ denotes the upper left corner of each pixel, for $0 \leq i < N$, $0 \leq j < M$, and the corner of the first pixel is denoted by $(x_o, y_o)$.

Using the above notation, equations can be derived for the coordinates of the boundary points A, B, C, D, E, and F of the first pixel $(x_o, y_o)$. As mentioned above, FIG. 3 depicts the boundary points of a CCD pixel. In either the full framed or the partially masked CCD, a pixel is hexagonal in shape. However, the length of a pixel, in the direction of flight varies in proportion to the difference in exposure time, $\tau$. Hence, the following relations apply:

$$A = (x_0, y_0) \quad [1]$$

$$B = \left( x_0 - \frac{H}{N} s \sin\theta, y_0 - \frac{H}{N} s \cos\theta \right)$$

$$C = \left( x_0 + \frac{W}{M} s \cos\theta - \frac{H}{N} s \sin\theta, \right.$$
$$\left. y_0 - \frac{W}{M} s \sin\theta - \frac{H}{N} s \cos\theta \right)$$

$$D = \left( x_0 + \frac{W}{M} s \cos\theta - \frac{H}{N} s \sin\theta + v\tau, \right.$$
$$\left. y_0 - \frac{W}{M} s \sin\theta - \frac{H}{N} s \cos\theta \right)$$

$$E = \left( x_0 + \frac{W}{M} s \cos\theta + v\tau, y_0 - \frac{W}{M} s \sin\theta \right)$$

$$F = (x_0 + v\tau, y_0)$$

The scale factor s is equal to h/f, where h is the height of the camera above the ground and f is the focal length of the camera. The term $v\tau$ in the expression for points D, E, and F represents the smear of the pixel. Note, however, that this term is different for each CCD format. In the full frame CCD, $\tau$, is equivalent to the shutter speed. In the partially masked CCD, $\tau$, is a percentage of this shutter speed. In order to accurately compare the smear associated with either CCD format type, it is necessary to first approximate the least amount of time $\tau^*$ required to transfer an exposed row of data under the mask in the partially masked CCD. Given $\tau^*$, the smear of a pixel associated with a partially masked CCD can be compared to that of a full framed CCD operating at its quickest shutter speed.

By operating a partially masked CCD without a shutter, we may simply expose a row twice as long as this time $\tau^*$ to insure that during the exposure of a row, the intensities of previously exposed rows may be transferred 2 rows towards the serial register. This will always guarantee that the masked portion of the parallel register will have a staggered layout, allowing a smooth transfer of the intensities from every row in the masked portion (which means every other row) to the row above it. The determination of $\tau^*$ is accomplished with information regarding the timing of the frame transfer CCD.

Transfer Time of Single Row

As previously mentioned, a frame transfer CCD can operate without the use of a shutter at television frame rates, i.e., approximately 30 frames per second. Because the time to read out the image in the storage register is equal to the exposure time of the image register, the time $\tau^*$, necessary to transfer the information in a single row of the storage register one step towards the serial register may be approximated. With a frame transfer CCD, the parallel register is divided into two parts, of which only the first section is exposed. Processing one frame (or in this case, the data from the masked half of the register) in 1/30 of a second, requires that the data under the masked portion of the parallel register must be transferred through N/2 rows towards the serial register. Assuming that no row may be transferred to a non-empty adjacent row, this read out process requires $2(N/2)-1=N-1$ steps. Therefore, $\tau^*$ may be approximated to be:

$$\tau^* = \frac{1}{30(N-1)} \qquad [2]$$

Modeling of Partially Masked CCD

With such an insignificant factor of smearing associated with the partially masked CCD, the projection of a pixel in the exposed row of the parallel register onto the ground may be approximated as a square. The fixed frame of reference may now be examined more closely to derive parametric equations for the initially exposed row of pixels in FIG. 2 relative to $(x_o, y_o)$:

$$(x_0, y_1) = \left( x_0 - \frac{W}{M} s\cos\theta, y_0 - \frac{W}{M} s\sin\theta \right) \qquad [5]$$

$$(x_0, y_2) = \left( x_0 - 2\frac{W}{M} s\cos\theta, y_0 - 2\frac{W}{M} s\sin\theta \right)$$

$$(x_0, y_j) = \left( x_0 - j\frac{W}{M} s\cos\theta, y_0 - j\frac{W}{M} s\sin\theta \right)$$

for $0 \leq j < M$

In these equations, $(x_o, y_o)$ represents the initial point of the initially exposed row. For the next exposed row, $(x_i, y_j)$ for $0 \leq j < M$, the aircraft will have moved a distance $v\tau$ in the positive x direction, where v is the velocity of the aircraft and $\tau$ is the exposure time of a pixel (in a row of pixels). Note, however, as only one row of the register is exposed, there will be no changes with respect to the y direction. Therefore, succeeding rows defined relative to the points $(x_i, y_o)$ for $0 \leq i < N$ are given by:

$$\begin{aligned}(x_1, y_0) &= (x_0 + v\tau, y_0) \\ (x_2, y_0) &= (x_0 + 2v\tau, y_0) \\ (x_i, y_0) &= (x_0 + iv\tau, y_0) \\ &\text{for } 0 \leq i < N\end{aligned} \qquad [6]$$

Using equations [5] and [6], the general case for all pixels in an NxM register, or more precisely all pixels associated with a given frame, may now be established:

$$(x_i, y_j) = \left( x_0 + iv\tau - j\frac{W}{M} s\cos\theta, y_0 - j\frac{W}{M} s\sin\theta \right) \qquad [7]$$

for $0 \leq i < N, 0 \leq j < M$

Equation [7] defines the coordinates for any pixel in the first N rows of exposure. However, with the partially masked CCD, when the parallel register has been filled, the array is transferred and read out as one image. As with the frame transfer CCD, this process requires $2N-1$ steps for a total time, $\zeta = (2N-1)\tau^* = (2N-1)/30(N-1)$, which may typically be approximated by 1/15 seconds. During this time, $\zeta$, the shutter will be closed. With this information, equations for any pixel in an arbitrary exposed row within a given frame may be defined.

$$(x_i, y_j) = \left( x_0 + v\zeta + iv\tau - j\frac{W}{M} s\cos\theta, y_0 - j\frac{W}{M} s\sin\theta \right) \qquad [8]$$

for $N \leq i < 2N, 0 \leq j < M$ $$(x_i, y_j) = (x_0 + (i \text{ div } N)v\zeta + iv\tau - \qquad [9]$$

$$j\frac{W}{M} s\cos\theta, y_0 - j\frac{W}{M} s\sin\theta \Big)$$

for $0 \leq j < M$

Note that equation [8] would be used only for a partially masked CCD that requires a complete readout of the parallel register when it is full. The equations will reduce, however, to equation [7] if the camera reads a row out through the output node for every new row being exposed.

CCD Sensitivity Analysis

The sensitivity of the location of the pixels to both the rotation of the camera, $\Theta$, and the velocity of the aircraft, v, is determined below with respect to percentage sensitivity. This is accomplished by dividing the first derivative of a function by the function itself and provides information on how small changes in the variable change the entire function. The smaller the number, the less sensitive the function is to the variable. Using equation [8], the percentage sensitivity of $x_i$ and $y_j$ with respect to v and $\Theta$ are given by the following:

$$\frac{dx_i}{dv} \frac{1}{x_i} = \frac{(i \text{ div } N)\zeta + i\tau}{x_0 + (i \text{ div } N)v\zeta + iv\tau - j\frac{W}{M} s \cos\theta} \quad [10]$$

$$\frac{dy_j}{dv} \frac{1}{y_i} = 0 \quad [11]$$

$$\frac{dx_i}{d\theta} \frac{1}{x_i} = \frac{j\frac{W}{M} s \sin\theta}{x_0 + (i \text{ div } N)v\zeta + iv\tau - j\frac{W}{M} s \cos\theta} \quad [12]$$

$$\frac{dy_j}{d\theta} \frac{1}{y_i} = -\frac{j\frac{W}{M} s \cos\theta}{y_0 - j\frac{W}{M} s \sin\theta} \quad [13]$$

The sensitivity of $y_j$ with respect to the velocity is 0, because the x axis is defined as the direction of motion. The percentage sensitivity of $x_i$ with respect to v and $\Theta$, and $y_j$ with respect to $\Theta$ will be small except when $x_i$ and $y_j$ are near 0. This is due to the derivatives being either a constant or a constant times a sine or cosine function.

Resolution Enhancement

It would appear that the resolution achieved by a CCD is fixed. Clearly, for the full framed CCD, this resolution depends on the size of the parallel register. This fixed resolution is due to the fact that the CCD only reads an average value of the light intensity for an area defined by each pixel.

FIG. 4 depicts full framed CCD resolution. In FIG. 4, f(x) represents the actual intensities of an object on the ground and F(x) represents the discrete average intensities of the object as recorded by a full frame CCD. This data is recorded by the camera as a limited approximation based on the range of intensities in a given pixel. Note that f(x) and F(x) are depicted as functions of only one dimension; a two-dimensional analysis of these average intensities with respect to the actual object intensities is directly related.

With the partially masked CCD, pixels again record the average intensity over a given area of the terrain. However, by only exposing one row of the parallel register, the change in the aircraft's position associated with the difference in the exposure times of two pixels in succeeding rows, $\tau \geq \tau^*$, is a fraction of the total length of a pixel in the direction of flight, $\delta$. Thus, by regulating the velocity of the plane, v, and the rotation of the camera, $\Theta$, an infinite number of overlapping succeeding pixels within the span, $\delta$, of a given pixel may be approached.

FIG. 5 depicts pixel overlap in the x direction with no camera rotation (i.e. $\Theta = 0$) and shows four overlapping pixels. Using these overlapping average intensities, the actual intensities of an object at evenly displaced points within the pixel may be more accurately determined. This is accomplished using a method of spline interpolation.

One Dimensional Spline Interpolation

FIG. 6 depicts spline approximation in the x direction. In FIG. 6, f(x) is again, the actual intensities of an object on the ground within the pixel length, $\delta$. In order to have better approximation of f(x), it is necessary to determine the intensity $z_i = f(x_i)$ at evenly distributed points $x_i$, $0 \leq i \leq L$, along Here L is the number of overlapping pixels. These intensities, $z_i$, will provide a piecewise linear interpolation, S(x), of the function f(x). The function S(x) can be determined by summing the series of spline functions, $B(x_i - i\delta/L)$ depicted in the figure. A base spline B(x) may be defined as:

$$B(x) = \begin{cases} \frac{\delta}{L} + x & -\frac{\delta}{L} \leq x \leq 0 \\ \frac{\delta}{L} - x & 0 \leq x \leq \frac{\delta}{L} \\ 0 & \text{otherwise} \end{cases} \quad [14]$$

Note that B(x) is nonzero only on the interval $[-\delta/1, \delta/1]$. Thus, in the sum S(x) the only nonvanishing basis spline at $x_i$ is the function $B(x_i - i\delta/L)$. Because the maximum height of the base spline, B(x), is $\delta/L$, at any given $x_i$, it is necessary to scale the function $B(x_i - i\delta/L)$ by multiplying it by the factor $z_i L/\delta$. This provides the appropriate level of intensity. The piecewise linear function S(x) is therefore equal to $$S(x) = \sum_{i=0}^{L} z_i \frac{L}{\delta} B\left(x - \frac{i\delta}{L}\right) \quad [15]$$

Note that by equation [14], S(x) interpolates the intensities f(x) of the points $x = i\delta/L$.

Referring back to FIG. 4, since F(x) is an average intensity of f(x) over the ith pixel length, it may be concluded that the areas under these two functions must be equal. Therefore, by integrating, the following formula is established:

$$F(x_i)\delta = \int_{\frac{i\delta}{L}}^{\delta + \frac{i\delta}{L}} f(u) du \quad [16]$$

Replacing f(x) with the spline approximation S(x) yields:

$$F(x_i)\delta = \int_{\frac{i\delta}{L}}^{\delta + \frac{i\delta}{L}} S(u) du \quad [17]$$

$$= \frac{L}{\delta} \sum_{j=i}^{i+L} z_j \int_{\frac{i\delta}{L}}^{\delta + \frac{i\delta}{L}} B\left(u - \frac{j\delta}{L}\right) du$$

The integral term in equation [17] is simply the area under the given spline which is easily seen to be equal to $(\delta/L)^2$ Note, however, that for each $F(x_i)$ it is necessary to determine only half the area under the splines at the points $x_i$ and $x_{i+L}$. Therefore a series of L equations may be established with which the subintensities $z_i$, $z_{i+1}$, ..., $z_{i+2L-1}$ within $F(x_i)$ and $F(x_{i+L})$ may be simultaneously solved for. Recall that L is the number of overlapping fields.

$$F(x_0)\delta = \frac{z_0}{2} + z_1 + z_2 + \ldots + z_{L-1} + \frac{z_L}{2}$$  [18]

$$F(x_1)\delta = \frac{z_1}{2} + z_2 + z_3 + \ldots + z_L + \frac{z_{L+1}}{2}$$

$$F(x_2)\delta = \frac{z_2}{2} + z_3 + z_4 + \ldots + z_{L+1} + \frac{z_{L+2}}{2}$$

$$\vdots$$

$$F(x_{L-1})\delta = \frac{z_L}{2} + z_{L+1} + z_{L+2} + \ldots + z_{2L-2} + \frac{z_{2L-1}}{2}$$

In the above equations, there are L equations and 2L unknowns. In order to increase resolution, it is necessary to determine the intensities $z_0, z_1, \ldots z_L$. With these first L intensities, it is possible to determine any sub-intensity $z_i$, $i \geq L$ in succeeding rows of pixels.

In FIG. 5, although the resolution in the x direction has been increased, the intensity recorded, in the y direction, of a given pixel is still an average length of the pixel.

In order to increase resolution in both the x and y directions, the camera may be rotated an angle $\Theta$. Pixel overlap with a nonzero angle $\Theta$ is depicted in FIG. 7. Notice, however, that the resolution in the y direction is inversely proportional to the resolution in the x direction. In order that a pixel to be evenly sectioned in both the x and y direction, it must be rotated at an angle $\Theta = \pi/4$. With an evenly displaced overlap in both directions a two-dimensional spline interpolation may be adopted in order to determine the actual intensities $z_{i,j}$ of an object at a given point $(x_i, y_j)$ in a pixel.

Spline Interpolation in Two Dimensions

In order to increase the resolution of the partially masked CCD camera, in both the x and y directions, a process may be adopted which is similar to that used in the single dimensional spline interpolation. An even distribution of pixels in both directions is required so that a given pixel may be sectioned into smaller areas. In order to section a pixel into L equal parts in both the x and y directions, 2L+1 overlapping pixels are required in the direction of motion. This will provide $L^2$ subsections for a given pixel.

FIG. 8 shows the overlap in the x and y directions for 5 overlapping rows each containing 3 pixels. If the extent of overlap of the center pixel in row 3 is examined, it is evident that every center pixel in other rows overlap the center pixel as well as the last pixel in rows 4 and 5. Notice, however, that with each overlapping pixel, the overlap is not consistent, as it was with the one dimensional case; the extent of overlap varies. This presents a problem in using the average pixel values to establish the spline interpolation that will determine the intensities $z_{i,j}$. An interpolation consistent with the one-dimensional spline B(x) allows for a definition of a two-dimensional base spline B(x,y) as a cone with height $\delta/L$.

$$B(x) = \begin{cases} \frac{\delta}{L} - \sqrt{x^2 + y^2} & x^2 + y^2 \leq \frac{\delta^2}{L} \\ 0 & \text{otherwise} \end{cases}$$  [19]

Since the maximum height of the base spline is $\delta/L$ at a given $(x_i, y_j)$ the function $B(x_i - i\delta/L, y_{j(k)} - k\delta/L)$ must be scaled by a factor $z_{i,j(k)}L/\delta$. Again, this will provide the appropriate level of intensity. Here, $0 \leq k \leq L$ and k represents the sectioned values between two succeeding pixels within the same row of data. In much the same process as that used in connection with one-dimensional spline interpolation, the series of spline functions which lie within a given pixel may be summed. Note that only portions of the areas coincide with the regions where different basis splines are not zero ($\frac{1}{2}$ about the edges of the pixel, $\frac{1}{4}$ at the four corners). The approximating function, S(x,y) is then $$S(x, y) = \sum_{i=0, k=0}^{L} z_{i,j(k)} \frac{L}{\delta} B\left(x_i - \frac{i\delta}{L}, y_{j(k)} - \frac{k\delta}{L}\right)$$  [20]

Again it follows that the volume under the function F(x,y) is equal to the volume under f(x,y). Hence, with integration:

$$F(x_i, y_j)\delta^2 = \int_{\frac{i\delta}{L}}^{\delta + \frac{i\delta}{L}} \int_{j(0)}^{j(L)} f(u, v) dv du$$  [21]

Replacing f(x,y) with the spline approximation S(x,y) provides:

$$F(x_i, y_j)\delta^2 = \int_{\frac{i\delta}{L}}^{\delta + \frac{i\delta}{L}} \int_{j(0)}^{j(L)} S(u, v) dv du$$  [22]

$$= \frac{L}{\delta} \sum_{m=i}^{i+L} \sum_{k=0}^{L} z_{i,j(k)} \int_{\frac{i\delta}{L}}^{\delta + \frac{i\delta}{L}} \int_{j(0)}^{j(L)} B\left(u - \frac{m\delta}{L}, v - \frac{k\delta}{L}\right) dv du$$

For an overlap of L pixels in either direction, a spline is centered at each cross-section of a given pixel, yielding a total of $(L+1)^2$ splines. Clearly, in a system of equations, each new pixel average will introduce 2L+1 new unknowns. Therefore, the solution, intensities $z_{i,j(k)}$, to these equations is not plausible. This is due to the fact that in FIG. 8, the distance between successive pixels in a row $(x_i, y_j)$ and $(x_i, y_{j+1})$ is a full pixel length $\delta$. Whereas the distance between the pixels from one row to another is a fraction of this length.

One possible solution which would offer pixel average values between pixels in a given row, would be a multi-tiered parallel register. For a doubled increase in resolution, this would require a 2-tiered parallel register as illustrated in FIG. 9.

Construction of a multi-tiered parallel register would require that both registers be partially masked. The second register would lie behind the first and would be shifted one row away from the serial register and a half row either up or down. Likewise, for triple resolution, three registers would be necessary. With this multitiered system, more average intensities would be gathered to solve equations [22].

Thus, the method of the present invention is as follows. First, sequential partially masked CCD camera images of terrain are acquired from a moving vehicle with n uniformly staggered registers exposed at any given time for an n-squared fold increase in resolution.

Next, vehicle position is established using known correlation methods. A known initial object is used to calibrate the camera and to initialize the resolution enhancement process.

Finally, a resolution enhancement method such as that set forth above is used to process the camera data and obtain a database of improved resolution data. The illustrative method using product splines to improve resolution by a factor of $n^2$ may be implemented as follows. Let $B(x,y)=B(x)B(y)$ where B is the linear spline defined by $$B(u) = \begin{cases} \frac{\delta}{n} + u, & \text{if } -\frac{\delta}{n} \leq u \leq 0; \\ \frac{\delta}{n} - u, & \text{if } 0 \leq u \leq \frac{\delta}{n}; \\ 0, & \text{otherwise.} \end{cases} \quad [23]$$

Again, $f(x,y)$ is the luminescent intensity of the terrain at position $(x,y)$. Interpolating f by the product spline S with $S(x_i, y_j)=f(x_i, y_j)$ yields:

$$S(x, y) = \frac{n^2}{\delta^2} \sum_{i=0}^{n} \sum_{j=0}^{m} f(x_i, y_j) B\left(x - i\frac{\delta}{n}, y - j\frac{\delta}{n}\right). \quad [24]$$

Each CCD pixel measures an average intensity $$F_{ij} = \frac{1}{\delta^2} \int_{i\frac{\delta}{n}}^{\delta + i\frac{\delta}{n}} \int_{j\frac{\delta}{n}}^{\delta + j\frac{\delta}{n}} f(u, v) du dv. \quad [25]$$

From the spline interpolation S, a system of $n^2$ linear equations for the intensities $f(x_i, y_j)$ in terms of the measured averages $F_{ij}$ is obtained:

$$\delta^2 F_{ij} = \sum_{i=0}^{n} \sum_{j=0}^{m} c_{ij} f(x_i, y_j), \quad [26]$$

with the coefficients given by:

$$c_{ij} = \begin{cases} 1/4 & \text{if } i = 0 \text{ and } j = 0, n; \\ 1/2 & \text{if } i = 0, n \text{ and } j \neq 0, j \neq n; \\ 1/2 & \text{if } i \neq 0, i \neq n \text{ and } j = 0, n; \\ 1, & \text{otherwise.} \end{cases} \quad [27]$$

The desired intensity values $f(x_i, y_j)$ are obtained as follows. First, the initialization procedure is applied to obtain the values of the first $2n+1$ $f(x_i, y_j)$, then the system of coefficients in equation [27] has $n^2$ unknowns and the same number of equations and is triangular. Thus the remaining values of $f(x_i, y_j)$ can be obtained using a known algorithm such as Gauss elimination with back substitution which employs only additions and multiplications. After the initial $n^2$ values have been determined in this manner, the values can be used to initialize the next set of $n^2$ values and the intensities are obtained by a sequential repetition of the above algorithm. The entire algorithm can be executed in real time by currently available microprocessors. The enhanced resolution intensity is obtained at any point (x,y) by using the spline interpolation $S(x,y)$.

FIG. 10 illustrates the method of the present invention in the special case of doubling the resolution in each of two orthogonal directions, hence, quadrupling the resolution of the CCD camera.

Physical Implementation

FIG. 11 shows an illustrative photogrammetric system for implementing the teachings of the present invention. The system 10 is adapted for use with a CCD camera 12 mounted on an aircraft (not shown) having a longitudinal (x or roll) axis, a transverse (y or pitch axis) and a z (yaw) axis. The camera is mounted for rotation about the yaw axis as discussed above. A pointing control mechanism maintains the camera 12 at an optimal angle Θ about the yaw axis with respect to the roll axis for a desired resolution in the manner discussed above. The output of the camera is input to a processor 16 which correlates aircraft position and speed with respect to a known object in a conventional manner and provides output image data. The output of the processor is input to a memory 18 for subsequent processing or display.

FIG. 12 is a block diagram of the processor of the illustrative photogrammetric system. The processor 16 includes first and second registers 24 and 26 which store aircraft position and speed information respectively from a conventional external source (not shown). Then element 22 correlates a current frame of image data from the camera 12 with a previous frame of image data provided by the memory 18 and aircraft position and speed information. A second memory 28 provides object reference information. The output of the correlator 22 is sharpened by a filter 30 which interleaves data from the scan lines of overlapping frames.

Thus, while in a conventional CCD camera implementation, the camera measures average intensity while the present invention provides actual intensity at L points between, the bounds of the pixel. Enhanced resolution in the direction of motion of the aircraft is provided by successive scans due to the motion of the plane. The method of the present invention requires the presence of an object of known location and shape to initiate the resolution enhancement process. Resolution enhancement in more than one direction requires a pointing of the camera at an appropriate angle.

Hence, the present invention has been described herein with reference to a particular embodiment for a particular application. Those having ordinary skill in the art and access to the present teachings will recognize additional modifications applications and embodiments within the scope thereof. For example, those skilled in the art will recognize alternative methods for obtaining the enhanced resolution such as transform techniques and a Fast Fourier Transform algorithm without departing from the scope of the present teachings.

It is therefore intended by the appended claims to cover any and all such applications, modifications and embodiments within the scope of the present invention.

Accordingly,
What is claimed is:

1. A method for generating photogrammetric images including the steps of:
   acquiring sequential images of terrain from a moving vehicle with a partially masked CCD camera having n uniformly staggered registers exposed at any given time;
   establishing the position of said vehicle;
   calibrating said camera with respect to a known initial object;
   initializing a resolution enhancement process; and
   processing the output of said camera to obtain a database of improved resolution data, wherein each pixel of said camera provides an average intensity of $F_{ij}$ as:

$$F_{ij} = \frac{1}{\delta^2} \int_{i\frac{\delta}{n}}^{\delta + i\frac{\delta}{n}} \int_{j\frac{\delta}{n}}^{\delta + j\frac{\delta}{n}} f(u,v)dudv.$$

where $n^2$ is the degree of resolution enhancement, $\delta$ s the length of a single CCD pixel projected onto the ground, and $f(u,v)$ is the luminous intensity of the point $(u,v)$ on the ground.

2. The invention of claim 1 wherein said processing step includes the step of calculating a base spline $B(u)$ wherein $B(u)$ is given by:

$$B(u) = \begin{cases} \frac{\delta}{n} + u, & \text{if } -\frac{\delta}{n} \leq u \leq 0; \\ \frac{\delta}{n} - u, & \text{if } 0 \leq u \leq \frac{\delta}{n}; \\ 0, & \text{otherwise.} \end{cases}$$

where n and $\delta$ have the same meaning as in claim 1 above.

3. The invention of claim 2 wherein the processing step includes the step of interpolating the luminescent intensity $f(x,y)$ of the terrain at position $(x,y)$ such that:

$$S(x, y) = \frac{n^2}{\delta^2} \sum_{i=0}^{n} \sum_{j=0}^{m} f(x_i, y_j) B\left(x - i\frac{\delta}{n}, y - j\frac{\delta}{n}\right).$$

where n, $\delta$, and f represent the same quantities as in claim 1 above, $(x_i, y_j)$ for $i=0, 1, \ldots, n$ are specific points on the ground, B is defined by equation, and $(x,y)$ represents an arbitrary point on the ground to obtain a system of $n^2$ linear equations for the intensities $f(x_i, y_j)$ in terms of the average intensities:

$$\delta^2 F_{ij} = \sum_{i=0}^{n} \sum_{j=0}^{m} c_{ij} f(x_i, y_j),$$

with the coefficients given by:

$$c_{ij} = \begin{cases} 1/4 & \text{if } i = 0 \text{ and } j = 0, n; \\ 1/2 & \text{if } i = 0, n \text{ and } j \neq 0, j \neq n; \\ 1/2 & \text{if } i \neq 0, i \neq n \text{ and } j = 0, n; \\ 1, & \text{otherwise.} \end{cases}$$

4. The invention of claim 3 including the step of using the initialization procedure to obtain values of the first $2n+1$ intensities.

5. The invention of claim 4 including the step of calculating the subsequent intensities to obtain $n^2$ intensity values.

6. The invention of claim 5 including the step of calculating a next set of $n^2$ intensity values to provide an enhanced resolution intensity at any point $(x,y)$ by using the spline interpolation $S(x,y)$.

7. A method for generating photogrammetric images including the steps of:
   acquiring sequential images of terrain from a moving vehicle with a partially masked CCD camera having n uniformly staggered registers exposed at any given time;
   establishing the position of said vehicle; and
   processing the output of said camera to obtain a database of improved resolution data, wherein each pixel of said camera provides an average intensity $F_{ij}$ as:

$$F_{ij} = \frac{1}{\delta^2} \int_{i\frac{\delta}{n}}^{\delta + i\frac{\delta}{n}} \int_{j\frac{\delta}{n}}^{\delta + j\frac{\delta}{n}} f(u,v)dudv.$$

where $n^2$ is the degree of resolution enhancement, $\delta$ is the length of a single CCD pixel projected onto the ground, and $f(u,v)$ is the luminous intensity of the point $(u,v)$ on the ground.

* * * * *